Patented Oct. 6, 1936

2,056,656

UNITED STATES PATENT OFFICE 2,056,656

RESIN OR BALSAM PREPARED WITH THE AID OF A REACTION-MODIFIER AND PROCESS OF MAKING SAME

Carleton Ellis, Montclair, N. J., assignor to Ellis-Foster Company, a corporation of New Jersey No Drawing. Application October 17, 1927, Serial No. 226,826

13 Claims. (Cl. 260—8)

This invention relates to resins, balsams and analogous products, prepared with the aid of a reaction-modifier, and to the process of making same, and relates particularly to products resulting from reaction between organic bodies containing hydroxyl, and the like, and those preferably containing the carboxyl or acid anhydride group or groups, all as altered in melting point and solubility, oriented in chemical composition or otherwise changed by said reaction-modifier.

More specifically my invention is concerned with the products derived from the reaction between an organic acid or plurality of such acids, a hydroxy body or analogous compound and a reaction-modifier of a basic character including both inorganic bases or basic substances and organic bases such as amines and amino compounds or other substituted ammonias.

GROUP I

Organic acids

The organic acids (including their anhydrides) embrace a wide range of bodies. These include aliphatic and aromatic mono-carboxy or mono-basic acids and the poly-carboxy or polybasic acids, including the di-carboxy acids and reactive terpene acids. These groups comprise saturated and unsaturated acids; oxy or hydroxy acids, aldehyde acids, ketone acids and other acids containing substituent radicals either composed solely of various assemblages of two or more of the elements CH and O, or other acids including substituent groups such as nitro, sulpho, chloro, bromo acids, and the like. Other acids that may be used include the cyclic acids of the aliphatic series or those containing both the aromatic nucleus and a cyclic aliphatic group also fall within the range of the acids whose use is not precluded under the present invention; naphthenic acid obtainable by oxidizing naphthenes including polynaphthenic acids, considered tribasic, these being mostly syrupy liquids, the latter being in all probability highly polymerized products.

Many of the foregoing acids are crystalline substances and these to a large degree contain in the molecule not over 10 or 12 carbon atoms. A few are water-soluble liquids or viscous bodies, and these as a rule weaken the resistance of the resulting complex towards water. This usually is disadvantageous in applications as coating compositions, but sometimes water-instability or water-solubility of the complex may be employed to advantage.

The fatty acids derived from the various natural animal and vegetable fats and oils, in other words, those of the natural glycerides, confer distinctive properties on the complex, including a notable degree of water-stability. The glycerides themselves likewise may be used, but being less reactive and assimilable than the free fatty acids they call for special procedures to bring the reaction to a satisfactory stage of completion or assimilation. These fatty acids generally have 16 to 18 carbon atoms in the molecule. Exceptions are the fatty acids of cocoanut oil, laurel oil, and the like, containing lauric acid (having 12 carbon atoms) and several fats and oils containing arachidic, erucic, behenic and similar acids containing over 18 carbon atoms. The employment of fatty acids (or their glycerides) containing one (mono) or more (poly) hydroxyl groups and oxidized fatty acids (blown oils) also are included.

A readily and cheaply available form of higher fatty acids is that obtained from the "soap stock" produced in the refining of glycerides, especially vegetable glycerides. Such acids may be modified and clarified by vacuum distillation.

Still another class of organic acids readily available are those of the natural resins. These are composed or contain reactive acids which are capable of adequately coupling the resin to the complex to yield products of utility.

More specifically the organic acids which may be used include succinic, citric, malic, malo-malic, mucic, maleic, fumaric, tartaric, pyro-tartaric, glutaric, lactic, acrylic, adipic, hydracrylic, glycolic, azelaic, diglycolic, glyoxylic, suberic, hydroxy-butyric, aceto-acetic, pyro-racemic, pyruvic, benzoic, chlorobenzoic, nitrobenzoic, benzoyl-benzoic, toluyl-benzoic, cinnamic, salicylic, diphenic, naphthoic, naphthalic, toluic, hydrocinnamic, amino-benzoic or anthranilic, camphoric, and the like. Liquid acids of the lower aliphatic acid series, such as propionic and chloracetic, generally are used only in a very restricted way, owing to the resulting physical properties, lack of water-stability, and so forth.

Some of the foregoing acids are not particularly heat-stable and since the preferred form of making the complex is by heat treatment, I prefer to employ those acids which react easily with the other raw materials, but do not break down readily into carbon dioxide or other bodies not contributing to the yield of complex. Benzoic, phthalic and even salicylic acids are good examples of heat-stable reactive acids of the non-carbonizing type giving complexes of light color and in good yield. Of these, phthalic acid being cheaply prepared as the anhydride by the catalytic oxidation of naphthalene is highly appropriate and is therefore used largely in the following illustrations.

In using the term organic acid it should be understood that I include the anhydrides as also substances generating or rendering available any acid of a suitably reactive character.

Organic acids, which, besides conferring water-stable qualities on the complex, to a greater or lesser extent, have good heat stability within the range of heat treatment preferably contemplated are the higher fatty acids, or, generally speaking, the fatty acids of the animal and vegetable oils. These embrace the fatty acids of lard, tallow, neatsfoot, seal, whale, menhaden, cod, cocoanut, palm kernel, peanut, olive, cottonseed, corn, soya, palm, rape, sesame, linseed, tung, perilla and sunflower oils and their oxidized, blown or hydrogenated, chlorinated or otherwise substituted derivatives. These oils include such acids as lauric, myristic, palmitic, stearic, oleic, erucic, behenic, linoleic, linolenic and clupanodonic acids.

Other and raw materials are the free acids of cocoa butter, japan wax and castor oil.

The fatty acids of cottonseed oil "soap stock" distilled under reduced atmospheric pressure, are commercially available at relatively low cost and serve as a cheap supply of mixed fatty acids light in color. For a number of uses to which the complex is put, color is an important consideration. The lighter the color, the greater the degree of adaptability of the complex and the wider its market. In the one form of the invention I am able to produce a complex which is almost water-white and transparent, when viewed in thin layers. Dark brown or black products, e. g., resembling asphalt in color, are of course, easier to prepare, but their field of utility in coating compositions is comparatively limited, and they are more appropriately employed in molded plastics and the like.

As indicated, the animal or vegetable oils themselves, in lieu of their fatty acids, may be employed by using special procedures such as are illustrated herein. Mixtures of the different oils may be used with or without inclusion of their free fatty acids. Likewise mixtures of the free fatty acids of different oils, especially those having differing chemical characteristics such as cottonseed acids and cocoanut acids, are desirable for certain purposes.

The various natural resins of commercial significance have acid properties and are reactive to form a complex suitable for various coating compositions. Hard products may be made with the aid of some of the copals such as the rather readily obtained congo. Pontianak copal, kauri, and the like, also may be utilized. For coating compositions solubility is important and these resins are desirably cracked by heat treatment. Heat may be applied sufficient to destructively distill over, for example, about 20 per cent of the weight of the resin when the solubility will be found satisfactory for most purposes and the resin despite the heat treatment will, nevertheless, be found reactive with the other raw materials entering into the complex.

Other resins are dammar, sandarac, mastic, elemi and particularly rosin and oxidized rosin. Rosin may be employed as the sole natural resin, or it may be admixed with other resins. Products containing any large proportion of rosin are not as desirable for exposure as those made with some of the other raw materials mentioned.

Oxidized rosin may be made by pulverizing ordinary rosin and exposing to warm air at a temperature below the melting point and as oxidation progresses the melting point rises, hence the temperature may gradually be increased. The rosin may contain an oxidizing catalyst such as a lead or manganese compound. Oxidation also may be caused to take place by blowing air through molten rosin in the presence of a catalyst or by treatment with hypochlorite or other chemical oxidizing agents. Oxidized rosin does not have the tackiness characteristic of ordinary rosin and possesses a considerably higher melting point if well oxidized. Some of the other oxygen-absorbing resins likewise may be oxidized.

In some cases it is desirable to incorporate a comparatively inert resin such as cumaron resin in the complex, not necessarily in chemical combination, but as a fluxing agent, or otherwise, to modify the character of the complex by simple blending, or by such mild action as may occur on heating.

While light color, solubility in appropriate organic solvents and resistance to atmospheric action are considerations of importance when the complex is to be used in coating compositions, these qualities, especially solubility, are of less significance when the complex is to be used in making plastic molding compositions, insulation, and the like. Uncracked copal may be used in the latter composition in some cases.

GROUP II

*Oxygenated bodies reactive with those of Group I*

These include bodies of quite differing chemical character embracing.

1. Glycerol, in its various forms,—dilute, concentrated, crude or refined.
2. Polyglycerols, or a mixture of polyglycerols and glycerol.
3. Various glycols, such as ethylene or propylene glycol.

These, if desired, may be derived from petroleum gases, by suitable reaction. Mixtures of glycols sometimes obtained from this source may be used to advantage.

4. Polyhydric alcohols containing a substituent in the hydroxyl, e. g., mono or dimethyl or propyl ether of glycerol. The mono ethyl ether of ethylene glycol has one hydroxyl free for reactive purposes. The glycerol and the glycol derivatives behave quite differently in the reaction, owing to different polymerizing tendencies and other properties.

5. Glycol ethers (inter-ethers).

The condensation of two or more molecules of a given glycol yields inter-ethers; e. g., two molecules of ethylene glycol condense to dihydroxy diethyl ether, three molecules give the dihydroxy triethyl diether, and so on.

6. Chlorhydrins or other halohydrins.
7. Ethylene oxide and particularly its homologues, e. g., butylene oxide.
8. Mannitol and analogous substances.
9. Pentaerythritol.

Various inorganic and organic bases alter the course of the resinification, either accelerating the reaction (thus serving as catalysts) or by orienting and altering the character of the resinification, and in some cases, entering into actual combination with the resin-forming material, or a part of the raw materials used therein, to produce new types of resinous substances.

Adding the base at the beginning of the reaction of resinification tends to yield a product of a character different from that formed on adding the base after resinification has progressed to a considerable extent and thereafter heating further to react the base with the resin acids, some of which have been formed by the earlier reaction. From glyceryl mono-phthalic ester, $$CH_2OH.CHOH.CH_2(CO.O.C_6H_5.COOH),$$

using zinc oxide as the base, the normal or basic salt of zinc may be formed. Diphthalic ester, $CH_2OH.CHOH.CH_2(CO.O.C_6H_5COOH)_2$ on the other hand should unite with zinc oxide in different combining proportions. Furthermore, a base may serve to form the salts of mixed resin acids, e. g., the zinc compound of the monophthalic and the diphthalic glyceryl resin acids. The base acts here as a coupling agent increasing the size of the resin molecule and substantially modifying its properties.

The foregoing illustrative reaction is not offered necessarily as a representative one since the reactions of resinification are diverse and complex and the reaction-modifying effect of the base may be diverted in one direction or another, depending on the actual conditions imposed.

A resin was made in the following manner:

150 parts by weight of water white rosin, 32 parts phthalic acid and 16 parts glycerol are heated with stirring, the temperature being raised gradually to 290° C. Preferably the rosin, phthalic acid and glycerol are all heated up together, or if desired the phthalic acid and glycerol may be first heated together for a short time to expel moisture, but without carrying the temperature high enough to form a resin from these two substances. The rosin is introduced prior to that transition. During the heating to 290° C. a considerable amount of water starts to distill off at 185° C. In the example in question after 3 hours continuous heating at 185° C. the temperature was lowered to 150° C. and 20 parts additional glycerol were added. At 240° C. the reaction mixture became more viscous and a sharp odor was noticeable at the upper end of the air condenser employed. The heating was discontinued when the temperature reached 290° C. and a greenish colored hard resin was obtained which was found to be soluble in acetone and a mixture of acetone and alcohol. The acid number of this complex is 11. 100 parts of rosin, 15 parts of phthalic anhydride and 25 parts glycerol heated with agitation to 290° C. gave a hard resin of acid number 7.7. It was found to be easily soluble in acetone and in mixtures of acetone and alcohol or ether and alcohol.

The addition of basic substances such as hydrated lime, zinc oxide or magnesium oxide at the close of the main reaction have a hardening effect by combining with the free resin acid.

For example, from 1 to 10 per cent of the base is introduced and the heating continued until sufficient combination has taken place. This procedure may be applied to the shellac phthalic glycerol, the Congo-phthalic-glycerol resin and others.

The tendency of many of the glyceride resins is to exhibit a high acid number. This acidity is due to free or uncombined acid. They also may be turbid through uncombined glycerol. Both a high acid number and the presence of free glycerol are undesirable for many purposes. With nitrocellulose I prefer to employ resinous substances having an acid number below 50 or 60 and I have found a product having an acid number between 10 and 20 to be particularly desirable. Preferably also I aim to secure a product substantially devoid of free glycerol as the latter, being hygroscopic, may affect the quality of the coating and cause turbidity therein. If various organic acids, phthalic acid, for example, is heated with glycerol in full combining proportions, that is 2 mols of glycerol to 3 mols of phthalic acid, combination appears to take place in a way indicative of the union of 1 mol. of phthalic acid or anhydride with 1 mol. of glycerol if the acid number is any criterion thereon. One mol. of phthalic acid esterifying completely with glycerol would form what may be termed a diglyceride. Or, 2 mols of phthalic acid could combine with 1 mol. of glycerol, the reaction in this case taking place to bring about reaction between one carboxyl group of each phthalic acid molecule and one hydroxyl group of the glycerol so that a carboxyl group of each phthalic acid molecule would be free, the other being united with glycerol to form an ester. It is possible that the reaction may progress in various ways and that mixtures of different glycerides are first formed and subsequently undergo transformation passing through a fusible and soluble form into an infusible form under the application of heat.

In treating phthalic-glyceride-resin with zinc oxide zinc phthalate may be formed. Phthalic anhydride and glycerol without other additions tend to form resins of high acid number. If heated for a protracted period to lower the acidity polymerization to an infusible insoluble resin may occur precluding use of the product in solution for coating purposes. Heat treatment with a very small proportion of zinc oxide lowers acidity and increases the melting point.

Concerning these resins, phthalic anhydride and glycerol, or other hydroxylated substances may be caused to combine in part and the acid number reduced by heating with a basic substance such as hydrated lime, magnesium oxide, or zinc oxide, until any free resin acid or free organic acid other than the acid actually combined in the resin, or that portion of it which is combined, is neutralized. In this manner I may obtain a calcium phthalate resin, a zinc phthalate resin, a magnesium phthalate resin, or other similar product.

Thus a phthalate resin of the distilled fatty acid type may be hardened by reaction with bases such as zinc oxide, calcium oxide, magnesium oxide, and the like, or their hydrates or other basic compounds of the alkaline earths of various metals. The reaction may be carried out by heating and the base combines forming an inherent part of the resin. By using a sufficient amount of base the solubility and fusibility may be considerably diminished. It is within the scope of the present invention to produce resins which instead of being soluble are resistant to most, if not all, solvents of the organic type. For example, distilled fatty acid phthalic glyceride resin, may be heated as for example, by baking to produce a less soluble and less fusible product, and if this treatment is continued long enough, insoluble and infusible products result. Conversion or reaction may be facilitated by the addition of the bases aforesaid.

In the proportion of 1.5 per cent of calcium oxide the reaction melt of phthalic glyceride became a viscous jelly at 175–180° C., without extensive frothing, and remained in this physical condition until a temperature of about 200° C. was reached, when quick solidification occurred forming a spongy, light-colored, infusible complex. The critical point of solidification is between 200 and 205° C. The calcium oxide enters into the reaction to yield a product containing calcium phthalate resin.

In other cases glyceride resin carrying a higher percentage of powdered quick lime, 10 per cent, or thereabouts, was placed in a mold and was subjected to heavy pressure at a temperature ranging from 150–210° C. Reaction was allowed to progress under pressure to secure a molded article containing the calcium phthalate resin.

Barium hydroxide has been used in a similar way in making molded articles. Also, it has been tested by heating with a resin-forming mixture of glycerol and phthalic anhydride. Used in the proportion of 10 per cent the following changes were noted on heating. At 140° C. water was evolved and the mix rapidly thickened to a paste. On heating to 220° C. a spongy mass formed. After cooling the resin was found to be light-colored, opaque and insoluble in water and organic solvents.

With 1 per cent of barium hydroxide the first appearance of water is at about 145° C. and this continues to be evolved up to 210° C. At 220° vigorous frothing occurred and the temperature fell to 185° C., remaining at this point for about five minutes. Then the temperature rose to 240° C. when solidification resulted.

Barium carbonate in the proportion of 10 per cent causes thickening at a temperature just above the melting point of phthalic anhydride. Between 140–150° C. the mass appeared as a sticky white product, which on cooling gave an ivory-colored resinous solid. This softens, but does not melt on the hot plate. Various resinous compounds of zinc likewise have been prepared, particularly the zinc phthalate resins. Some of these have desirable properties. A mixture of 3 mols phthalic anhydride with 2 mols glycerol, to which had been added 1 per cent of zinc oxide was heated in a receptacle provided with an agitator and an air condenser (reflux condenser). Solidification took place at 225° C. without extensive frothing. The resulting resin was hard, non-porous and softened somewhat on heating to 100–120° C.

A resinous composition was prepared from glycerol 85 parts, phthalic anhydride 160 parts, rosin 80 parts, cottonseed fatty acids 90 parts, the mixture being heated to 290° C. in about one-half hour, while nitrogen was bubbled through. This temperature was held for about one hour and then 20 parts of zinc oxide were added with stirring while the temperature was held as nearly as possible at 290° C. for one-quarter of an hour longer. The acid number of the product was 29.2. It was soluble in toluol and in various nitrocellulose mixed solvents. A thin film of the resin and also one made from nitrocellulose and the resin showed no whitening on immersion for many hours in water at room temperature. A somewhat similar resin is made using toluyl benzoic acid in place of rosin.

A resinous composition made from glycerol 85 parts, phthalic anhydride 160 parts, distilled fatty acids of cottonseed oil 90 parts, rosin 80 parts, was heated to 290° in one-half hour employing a current of nitrogen as in the preceding example. The temperature was held at 290–300° C. for an hour. The acid number was 41.5. 50 parts of this product were heated with 1 part of zinc oxide at 280–290° C. for ten minutes. Apparently very little solution of the zinc oxide occurred, but the product on cooling had an acid number of 32.1 and was soluble in toluol.

When an excess of the base is employed and is not dissolved or taken up by the resin, such excess base may be separated from the resin if desired. If the hot melt is allowed to settle the clear resin may be poured off, or the resin dissolved in solvents yields a solution which may be filtered or centrifuged. In many cases the base such as zinc oxide serves as a pigment and when resin is to be employed as a coating composition the presence of such undissolved material may not be objectionable. Likewise, for molding purposes, the excess of base when present may serve as a filler.

In another case a mixture of the following was made:

| | Parts |
|---|---|
| Glycerol | 85 |
| Phthalic anhydride | 160 |
| Distilled fatty acids of cottonseed oil | 90 |
| Rosin | 80 |
| Pulverized calcium oxide | 23 |

This mixture was heated to 290° C. in one-half hour and was observed to foam badly. The reaction was conducted with agitation. The resulting product was of a sticky soft nature. When 20 parts of zinc oxide were used in place of 23 parts of calcium oxide, a similar soft and sticky product was obtained.

Malic acid and glycerol, equi-molecular proportions, when heated react at about 209–210° C. If 1 per cent of zinc oxide is added the solidification point is 188–190° C.

Other alkaline or basic modifiers such as soda, lime, sodium sulphide, and the like, have been tested, but the employment of alkalies forming water-soluble compounds is objectionable for many purposes.

The ideal synthetic resin for use as a coating material (ordinarily dissolved in a volatile solvent) should be of a tough and durable nature and preferably should be easily soluble in cheap solvents. It should be sufficiently hard and durable to be used alone and will be found to have a still wider range of utility if it is compatible with nitrocellulose so that solutions of the resin and nitrocellulose yield even tougher and harder films. The resins from polyhydric alcohols with polybasic acids have significant qualities in this direction and in aiming to secure their betterment I have given consideration to the following:

1. Prevention of formation of insoluble resinous products when making the resin by heating the raw materials to a reacting temperature. As noted above polymerization or condensation phenomena may set in suddenly forming an infusible and insoluble mass, which cannot be utilized in coating compositions.

2. Attaining solubility in cheap solvents, especially hydrocarbon solvents such as benzol and homologues.

3. Overcoming softness (lack of hardness) while still retaining solubility.

4. Increasing water-resistance without losing solubility characteristics. The partially resinified material containing in some cases mono or di glycerides, and the like, is whitened badly by water and when used as a coating composition outdoor exposure must be avoided in most cases. I aim to increase the water-resistance to a point where a coating of the resin alone or with nitrocellulose is slowly, if at all, whitened by contact with water.

5. Decreasing acid number to a point consistent with the commercial requirements of resins which must be non-corrosive, or must not have any unfavorable chemical action on nitrocellulose.

Items 4 and 5 may be coupled with 1 since high acid number and lack of water-resistance may be attributed largely to incompleteness of condensation. Advancing the combination of the reacting materials and the condensation of the partially-formed or incipient resinous substances, while lowering the acid number and improving the water-resistance, also causes the formation of insoluble polymerization products. Two methods for the prevention of the formation of insoluble products will be described:

(A) Employing a sufficient proportion of monobasic acids in conjunction with polybasic acid and polyhydric alcohol aforesaid.

(B) The use of anti-polymerization modifiers of reaction including amines such as aniline, toluidine, and the like, and also urea and substituted ureas such as thiourea.

A study of Item A has shown that the inclusion of higher fatty oil acids gives excellent results from the standpoint of toughness and durability, but if sufficiently large proportions are employed to prevent the formation of infusible polymers or condensation products, the product may be too soft for some coating purposes. The acids of fatty oils with sufficient monobasic acid of another type to prevent the formation of infusible polymers and condensation products enables heat treatment to be continued until adequate water-resistance is attained.

Thus a resin obtained by reacting glycerol 85 parts, phthalic anhydride 160 parts, fatty acids of cottonseed oil 90 parts and rosin 80 parts does not readily form an infusible polymer or condensation product during the drastic heating required to obtain a product which does not whiten on protracted contact with water.

Resins having a harder, tougher nature have been obtained by the employment of a reaction-modifier of the organic base type, particularly urea. 1 per cent of urea, based on the raw mix, has been found to check the formation of infusible polymers sufficiently so that a more completely reacted, but soluble product is obtained. For example, by reacting 77 parts by weight of 98 per cent glycerol, 160 parts phthalic anhydride and 90 parts of the fatty acids of cottonseed oil, or of the fatty acids of cocoanut oil in the presence of 1 per cent of urea there is yielded a product having a softening point (ball and ring method) higher by 20 degrees or more than when the same reaction mixture is made without the urea reaction-modifier and carried to the uttermost point at which the resin still remains sufficiently soluble to be used in a coating composition. Resins which have been reacted in this extensive manner in the presence of a reaction-modifier or an anti-polymerization catalyst are usually considerably more viscous in solution than resins made without the catalyst and reacted as far as possible while preserving solubility. Thus it appears that the complex produced by using the anti-polymerization catalyst is of higher molecular weight. Moreover, the durability of resins of this general type appears to increase as the viscosity in solution increases and as the toughness of the solid resin becomes enhanced. The production of soluble resins of increased molecular weights and having a colloidal structure of different and complex nature is within the purview of the present invention.

There may also be mentioned resinous bodies or complexes of the glycerol (glycol or mannitol) organic acid type prepared with the aid of amines such as aniline, toluidine, naphthylamine or similar amino, or, in some cases, amido bodies.

A product of desirable solubility in the nitrocellulose field is obtained by reacting together phthalic anhydride, glycerol and common rosin. It usually has an acid number ranging from 10 to 20. In one case rosin phthalic glyceride resin was made by heating 81 pounds window glass rosin, 21 pounds glycerol and approximately 19 pounds phthalic anhydride to a temperature of approximately 290° C. The heating was carried out gradually with agitation. About 112 pounds of resin having an acid number of 10.9 were obtained. When 100 parts by weight of this resin were heated at 290° C. with 5 parts of para-toluidine the acid number became 4.9 and when 10 parts of toluidine were employed the acid number was zero. In other words, a neutral resin was obtained. The temperature employed in reacting on the acid product with the amine may be varied depending on the character of the latter. The reaction may take place at atmospheric pressure, or at pressures above or below atmospheric. These toluidine-modified products may be employed in making lacquers containing nitro-cellulose where the absence of free acid is desirable. Also, in some molding compositions employed in hot pressing, the absence of free acid is considered advantageous as there is less likelihood of injury to the steel molds.

When the object is to produce fusible resins to be used for example as substitutes for shellac in plastic molding compositions the treatment with an amine of the aniline type, for example, aniline or toluidine and homologues is advantageous for two reasons, namely, the acid number is reduced and undue polymerization is avoided if an adequate amount of the amine is present. Thus the reaction with a base affords a means of obtaining from acid resins products which are of reduced acidity or neutral such that they may be used freely in products sensitive to acids, for example, nitrocellulose solutions, or in other ways where a high acidity would be disadvantageous. When the acidity of the resin or complex is so great that the aniline, toluidine, or other compound produced interferes with its properties, the secondary compound may be removed by suitable purification methods. If an excess of the amine, for example, aniline, is used, that which has not entered into combination may be recovered, for example, by distilling with steam.

The reaction of resinification in the presence of a reaction-modifier may be carried out at atmospheric pressure or at pressures sub-atmospheric, or at pressures which are above atmospheric. For example, 111 parts of phthalic anhydride and 46 parts of glycerol were heated at atmospheric pressure to 200-210° C. yielding a clear very light-colored soft gummy mass. This was transferred to an autoclave and 10 parts of aniline were added. The autoclave was heated in a lead bath to insure an even temperature. The bath was brought to 290° C. and held at that temperature for about one-half hour. During this heating pressure was developed and a valve at the top of the autoclave was opened very slowly from time to time in order to keep the pressure between 80 and 100 lbs. After the temperature had been maintained for about 10 minutes at 290° C. the pressure did not show a tendency to increase greatly, but became practically constant in the neighborhood of 85-90 lbs. (This is ordinary gage pressure above atmospheric pressure.) Therefore, pressure was not released thereafter during the heating. The autoclave was opened while still hot and the resin was found to be in a liquid condition with no indication of formation of infusible products. On cooling a hard, brittle, brown resin was obtained having a melting point (ball and ring method) of 94° C. and an acid number of 48.5. The resin was soluble in acetone and also in a mixture of alcohol and benzol. It was insoluble in toluol and in a mixture of toluol and butyl acetate.

Cottonseed phthalic glyceride resin of acid number 26.2 was heated to 200° C. at atmospheric pressure with 10 per cent of para toluidine. The acid number was reduced to 4.1.

A mixture of equivalent proportions of phthalic anhydride 111 parts and glycerol 46 parts was heated with 10 per cent of xylidine to 290° C. at atmospheric pressure. An infusible product was not formed until the heating at 290° C. had progressed for 10 minutes or longer. A resin lighter in color than that obtained when using toluidine was produced.

Diphenylamine also has been employed as a reaction-modifier. A mixture was made of phthalic anhydride 160 parts, glycerol 77 parts, cottonseed fatty acids 90 parts, diphenylamine 3.2 parts (1 per cent) and this was heated under an air cooled reflux condenser at atmospheric pressure to 290° C. for nearly 30 minutes. The resin which formed thickened gradually.

Incipient phthalic glyceride was heated to 285° C. with 10 per cent of m-phenylene diamine at atmospheric pressure. A yellowish resin resulted, lighter in color than those obtained with the aid of aniline or toluidine. At 290° C. polymerization and solidification set in, beginning at the bottom of the receptacle instead of the top. (Solidification to infusibility in most of the preceding examples begins at the top of the melt and advances downwardly.)

The hydrogen in the para position in dimethyl aniline is very reactive. The following was noted: Cottonseed phthalic glyceride resin, melting point 62° C., was heated with 10 per cent of dimethyl aniline at atmospheric pressure using a reflux (air-cooled) condenser. When the temperature reached 160° C. vigorous foaming occurred, and, although the source of heat was removed, the temperature rose to 210° C. Further heating (by external means) brought the temperature to 230-240° C. when foaming began again and spontaneous heating was in evidence. A slightly sticky resin of melting point 65° C. resulted.

In another case 160 parts phthalic anhydride, 77 parts glycerol, 90 parts cottonseed fatty acids and 3.3 parts dimethyl aniline (1 per cent) were heated at atmospheric pressure with air-cooled reflux condenser. At first a reddish yellow color developed, turning green at about 150° C. and on further heating becoming dark blue, finally very dark brown at 250° C. The mass solidified at 281° C.

A mixture of equivalent proportions of phthalic anhydride and glycerine was reacted to an incipient resin and 10 per cent of mono ethyl aniline-m-sodium sulphonate was added. Heated in an open vessel the mass acuired a green color at 200° C. and became infusible at 280° C.

A mixture of 110 parts phthalic anhydride and 46 parts of glycerol was heated to 210° C. and cooled, giving a transparent, almost water-white, gummy material, to which was added 1 part of ortho amido phenol. The composition was then heated in an open vessel and very pronounced foaming occurred at 180-190° C. It was found that the temperature could be carried up to 290° C. without formation of an infusible material. On holding at this temperature for a time the mass set to a condition of infusibility. Ortho amido phenol tends to form ring compounds with acids and it is probable that reaction of this character occurred, uniting the amido phenol to the resinous bases. Para amido phenol does not behave in a similar manner. When this compound was substituted for the ortho compound the mixture began to thicken considerably at 230° C. and formed on cooling a hard, brittle resin. On further heating an infusible mass resulted at 240-242° C.

A similar mixture of phthalic anhydride and glycerol reacted to an incipient resinification was mixed with 10 per cent of pyridine and heated at atmospheric pressure, using an air-cooled reflux condenser. At the beginning of the heating a small proportion of pyridine distilled away, but the remainder apparently entered into combination and at 200-210° C. rapid darkening took place, the whole mass becoming almost black in color. Reaction went on smoothly with further heating until a temperature of 255° C. was reached, at which point a very gradual solidification took place, the mass slowly changing into a black spongy solid.

When a similar reaction mixture was heated under pressure very different results were secured. Thus a similar charge of incipient gum with 10 per cent of pyridine was placed in an autoclave and was gradually and uniformly heating by having the autoclave situated in a metal bath of low melting point alloy. The temperature of the molten metal bath was raised to 290° C. and was maintained at this point for about 30 minutes. The pressure rose rapidly and was released from time to time to maintain a pressure in the autoclave of between 80 and 100 lbs. above atmospheric pressure. The autoclave was opened while still hot and a perfectly liquid melt was obtained. This was dark in color and on cooling yielded a resin of moderate hardness, whose acid number was 29.2. The melting point was 62-63° C. It was easily soluble in benzol, acetone, and in a mixture of benzol and alcohol.

10 per cent of benzidine incorporated with the incipient gum aforesaid of phthalic anhydride and glycerol heated in an open vessel at first formed a blue colored mass, soon becoming greenish yellow. At 160-170° C. a solid, pasty product resulted and on cooling a greenish yellow soft gummy balsam resulted. The action of benzidine differs quite considerably from a number of the amines described above.

Diphenylguanidine used in the proportion of 10 per cent yields a mass green in color becoming bluish on further heating and finally at 240° C. a dark yellow color.

Alpha naphthylamine used in like manner at atmospheric pressure allowed the temperature to be raised to 290° C. without solidification and with very little discoloration. On heating for 20 minutes at 290° C. a very thick viscous product was obtained, which on cooling was a hard transparent resin of yellowish brown color.

Furfurylamide used in the proportion of 10 per cent as above allowed heating to 290° C. without polymerization to infusibility and a dark, hard resin resulted.

Benzaldehyde ammonia reacts with incipient phthalic glyceride resin to form a tough product. In one case 2 parts phthalic anhydride, 2 parts glycerol and 1 part benzaldehyde ammonia were heated at atmospheric pressure with agitation to 232° C. A soluble resin was obtained. A molding composition was prepared using 1 part of the resin to 3 parts of filler, the resin being dissolved in a solvent composed of alcohol and benzol. The composition was shaped by pressing and baked. The resulting molded article was fairly hard and of good strength.

Using a lesser proportion of benzaldehyde ammonia the following composition was prepared:

| | Parts |
|---|---|
| Phthalic anhydride | 160 |
| Glycerol | 77 |
| Cottonseed fatty acids | 90 |
| Benzaldehyde ammonia | 10 |

This mixture was heated at atmospheric pressure using an air-cooled reflux condenser. The temperature was raised to 310° C. within 20 minutes without signs of polymerization to infusibility. Then the temperature was lowered to 290° C. and maintained for 30 minutes. A high degree of foaming was observed throughout the reaction. On cooling a dark brown fusible soluble resin resulted. This proved to be strong and tough and on warming became rubbery and elastic. It had excellent solubility in various organic solvents. The melting point was 69–70° C., as determined by the ball and ring method, and the acid number was 26.5.

Hexamethylene triphenol was used in like proportions with a similar mixture as that just previously described. The heating was carried out at atmospheric pressure using an air-cooled reflux condenser and the temperature was brought to 290° C. without polymerization. After maintaining at this temperature for 30 minutes considerable foaming and bumping was observed. The heating was continued for 1 hour. This reaction yielded a dark colored fairly tough resin of moderate hardness and of good solubility. The acid number was 31 and the melting point 70–71° C.

When 10 per cent of hexamethylenetetramine is heated with phthalic glyceride a yellow transparent solid is obtained at 170° C., which is slightly soluble in water. At 175° C. white fumes are given off and at 235° C. the point at which the phthalic glyceride alone would polymerize to an infusible mass, no sharp solidification was observed, but the mass became thick and pasty. On cooling the material did not solidify, but appeared in the form of a soft tacky semi solid, only partially soluble in a mixture of benzol and alcohol, depositing a white precipitate from this solution.

The following mixture was prepared:

| | Parts |
|---|---|
| Phthalic anhydride | 160 |
| Glycerol cottonseed fatty acids | 77 |
| Hexamethylenetetramine | 10 |

The mixture was heated at atmospheric pressure using an air-cooled reflux condenser and darkening occurred below 150° C., while an energetic reaction took place at 160–170° C. and also again at 230° C. with notable foaming. The temperature finally reached 290° C. in 40 minutes heating without polymerization and was held at this point for 1 hour. Considerable foaming and bumping was observed and acrolein was given off. The product is a dark soft resin of acid number 26.

Urea and its several derivatives have been found to exhibit especially good properties as a reaction-modifier and using urea in this manner I have been able to secure resins and balsams which not only are useful in conjunction with nitrocellulose to make lacquers, but also may be used without lacquer to form a coating, which resembles in some respects, a film of dried linseed oil. This, it should be understood, is secured without going through the drying required of linseed oil. In other words, the urea modified resin is dissolved in a volatile solvent to make a "spirit varnish", as it were, and when such a solution is applied to a surface the solvent evaporates in the course of a few minutes leaving the linoxyn-like film behind. I therefore propose the use of such resins to secure quick drying paints or varnishes for various purposes.

In one case molecular proportions (one molecule each) of ethylene glycol and diphenic acid were heated with 1 per cent of urea, based on the total weight of the mixture. On heating for ½ hour at 290° C. a viscous light amber colored synthetic balsam was obtained which was soluble in a mixture of equal volumes of toluol and butyl acetate. The acid number was 22.4.

Equi-molecular proportions of glycol ether and tetra chlor phthalic acid with 1 per cent of urea were heated to 260° C., yielding a viscous reddish brown balsam insoluble in toluol, but soluble in various mixed solvents such as a mixture of equal parts of toluol, butyl acetate and butyl alcohol. The solution had a yellow fluorescence.

In the foregoing example the glycol ether employed was that formed by the condensation of two molecules of glycol yielding the dihydroxy diethyl ether. The following example is prepared from the dihydroxy triethyl diether. This ether and succinic acid in equi-molecular proportions were heated with 1 per cent of urea to 290° C. and held at this temperature for ½ hour, yielding a soft sticky balsam of light amber color, with acid number of 21.6 and soluble in mixed nitrocellulose solvents.

46 parts glycerol, 111 parts phthalic anhydride and 10 parts urea were heated at atmospheric pressure to 290° C. for 1 hour without polymerization to form infusible products. A resin resulted which had properties quite different from the phthalic glycerine product made without urea. Thus the urea treated material had better solubility, being soluble in benzol, toluol, butyl acetate and in mixtures of these solvents. A solution of the resin in a mixture of benzol and butyl acetate in which nitrocellulose was likewise dissolved, yielded a good film. The acid number of this resin was 51. Using the same proportions but keeping the temperature at a somewhat lower point, namely; 270–275° C., a lighter colored resin resulted, which was hard and strong, and having an acid number of 31.2 and a melting point of 96–97° C. It was soluble in benzol, toluol, butyl acetate and their mixtures. 11 parts phthalic anhydride, 46 parts glycerol, 10 parts urea, were heated at atmospheric pressure to 240–250° C. for 3½ hours. A hard brittle resin having a melting point of 80–81° C. and an acid number of 35 resulted. While soluble in toluol and in a mixture of toluol and butyl acetate, the solubility of the resin was somewhat lower than the last two described above.

160 parts phthalic anhydride, 77 parts glycerol, 90 parts cottonseed fatty acids, and 3.2 parts urea, representing 1 per cent of the mixture, were heated at atmospheric pressure to 290° C. and held for 1 hour without solidification. A very strong and tough resin resulted having an acid number of 42 and melting point of 80–81° C. A resin made in substantially a similar manner was found to be soluble in hydrocarbons and on evaporation of the solvent to leave a film very much like linoxyn. A solution was made from 70 parts of this resin and 140 parts xylol. This 33⅓ per cent solution is of a viscosity corresponding substantially to that of spar varnish and brushes well, giving a film which is dried in ½ hour. The film is of an amber color. Copper wire was dipped in this lacquer and allowed to dry, forming an insulating coating. In another case titanox pigment was ground in the lacquer, using an ordinary paint mill. This gave a paint or lacquer enamel which brushed easily and dried in ½ hour to a film which was as hard as a film of ordinary house paint dried for 48 hours. The film made with the synthetic product had a notably high gloss finish. Wood and metal surfaces were coated with varnishes and paints made from the foregoing. Steel panels were surfaced with the clear varnish. Also, a 20 per cent solution of nitrocellulose was mixed with an equal volume of a 50 per cent solution of the urea treated resin, the mixture being thinned slightly with amyl acetate and various surfaces were coated with this composition.

Phthalic anhydride 74 parts, glycerol 31 parts and urea 3 parts were heated at atmospheric pressure, using an air-cooled reflux condenser, but no agitation. The temperature was raised to 230° C. and maintained for 1 hour between about 235 and 240° C. Polymerization to infusible bodies did not occur, although without the urea such action would have occurred within a few moments after reaching 235° C. At this temperature a light colored resin results. Owing to the lower temperature, however, the acid number is higher. The resin was found to be soluble in acetone and in a mixture of alcohol and benzol.

A composition was made employing a higher percentage of urea, the proportions were as follows:

| | Parts |
|---|---|
| Glycerol | 77 |
| Phthalic anhydride | 160 |
| Distilled cottonseed fatty acids | 90 |
| Urea | 32 |

This mixture was heated gradually at atmospheric pressure and when the temperature had reached 150° C. the rate of heating was reduced to hold the temperature between 150–170° C. and affording opportunity for biuret to form. There was much foaming with evolution of some ammonia. This reaction subsided between 180–240° C., but began again at around 250° C. The temperature finally was held at 290° C. for one hour. A very soft tar-like product with an acid number of 65 resulted.

The following composition employing castor oil was prepared.

| | Parts |
|---|---|
| Glycerol | 67 |
| Phthalic anhydride | 160 |
| Castor oil | 90 |
| Urea | 3.2 |

This mixture was heated in a receptacle open to the air through a short air-cooled reflux condenser. Two layers formed after the substances melted, but 220–225° C. these layers began to merge one into the other and at 240° C. a uniform clear liquid of light yellow color resulted. At the end of one hour from the beginning of the heating the temperature had reached 295° C. It was held at 290° C. for 45 minutes longer. The product was found to be a rather soft sticky resin, which in layers about ¼ inch thick exhibited a golden yellow color. The acid number was 31.5. The resin was soluble in toluol.

Other castor oil compositions are the following:

| | Parts |
|---|---|
| Glycerol | 67 |
| Castor oil | 90 |
| Phthalic anhydride | 160 |
| Urea | 2.17 |

The mixture was similarly heated, but was agitated during the reaction period by bubbling a stream of nitrogen through the melt. The temperature was taken to 290° C. and held for 20 minutes, yielding a light colored rubbery tough material.

| | Parts |
|---|---|
| Glycerol | 67 |
| Castor oil | 70 |
| Phthalic anhydride | 160 |
| Urea | 6 |

Heating was conducted in a receptacle open to the air equipped with an air-cooled reflux condenser. The temperature was brought to 290° C. and samples were drawn after ½ hour and 1 hour. These samples when cooled were soft sticky resins. The heating at 290° C. was continued for a total period of 1 hour and 45 minutes. A slightly tacky and very tough resin with an acid number of 37 and melting point of 63 resulted. The resin was quite readily soluble in various organic solvents, including benzol and toluol hydrocarbons.

The following formula embraces the fatty acids of cocoanut oil.

| | Parts |
|---|---|
| Glycerol | 77 |
| Phthalic anhydride | 160 |
| Cocoanut oil fatty acids | 90 |
| Urea | 3.25 |

Heating was carried out at atmospheric pressure using reflux condenser as in the preceding example and employing nitrogen for agitation and to create an inert atmosphere. The temperature was raised to 240° C. and held for 1 hour, then raised to 290° C. and maintained at this point for ½ hour. A very tough product was secured, which was soluble in toluol, xylol, pine oil, and various lacquer solvents. The softening point by the ball and ring method was 78° C. When the distilled acids of cottonseed oil were substituted for the cocoanut oil fatty acids in the above formula, a darker resin resulted.

| | Parts |
|---|---|
| Glycerol | 68.5 |
| Cocoanut oil fatty acids | 80 |
| Phthalic anhydride | 142 |
| Urea | 5.8 |

This mixture was heated and maintained at 285-290° C. for 4 hours without forming infusible polymers. The resin was soluble in toluol.

|  | Parts |
|---|---|
| Glycerol | 33.5 |
| Blown sardine oil | 45 |
| Phthalic anhydride | 80 |
| Urea | 3 |

On heating at atmospheric pressure the blown oil appeared to enter into combination rather quickly. The temperature was raised to 240° C. in ½ hour and then to 290° C. in 1 hour more. No infusible products were formed. The product is a soft sticky material soluble in toluol and compatible with nitrocellulose.

|  | Parts |
|---|---|
| Glycerol | 123 |
| Phthalic anhydride | 148 |
| Sebacic acid | 202 |
| Urea | 14 |

On heating to 290° C. for 2 hours a sticky resinous product resulted.

Biuret has properties somewhat similar to urea. 77 parts glycerol, 160 parts phthalic anhydride, 90 parts distilled cottonseed fatty acids and 10 parts of crude biuret containing some cyanuric acid were heated at atmospheric pressure, the temperature being raised to 290° C. in about 45 minutes and then held at this point for 1 hour. A soft resin was obtained.

Para phenetyl urea was added in the amount of 10 per cent to a partially resinified product made from 111 parts phthalic anhydride and 46 parts glycerol. On heating at atmospheric pressure up to 290° C. a very light colored hard resin was obtained soluble in a mixture of benzol and alcohol. In like manner phenetyl urea was employed in the following composition.

|  | Parts |
|---|---|
| Glycerol | 67 |
| Phthalic anhydride | 160 |
| Castor oil | 70 |
| Para phenetyl urea | 9 |

The mixture was likewise heated at atmospheric pressure and the temperature brought to 290° C. Even on heating for 45 minutes at this temperature the formation of infusible products was not observed. Finally it was desired to determine at what temperature the melt would become infusible, hence the temperature was gradually advanced and polymerization to an infusible product occurred at 335-340° C. with a total time of heating of 1 hour and 27 minutes. The temperature to which melts of this character should be raised, in order to obtain a soluble product of low acid number and sufficiently well reacted to be satisfactory in coating compositions need not exceed 300° C. as a rule, hence the phenetyl urea serves the purpose of permitting reaction to progress to the desired degree, yielding useful soluble products. Para phenyl urea also has been used in connection with the formation of the phthalic glyceride resin.

Using thiourea the following mixture was prepared.

|  | Parts |
|---|---|
| Glycerol | 77 |
| Phthalic anhydride | 160 |
| Cottonseed fatty acids | 90 |
| Thiourea | 3 |

The first three ingredients were melted, raising the temperature to 150-160° C., then the thiourea was added. Reaction accompanied by the evolution of water started immediately after the addition of the thiourea. The temperature was brought to 290° C. and held there for 1 hour. A tough resin of good solubility in organic solvents was obtained. The melting point was 68-69° C. and the acid number 30. In like manner thiourea was used in twice the amount, the composition otherwise being the same, yielding a soft sticky product. This balsam was found to be of good solubility in various organic solvents and the acid number was 26.

Tri-ethanol amine and phthalic anhydride react on heating to form a resin which polymerizes to an infusible state at relatively low temperatures. Urea acts to prevent formation of infusible substances during the period of desired reaction necessary to secure a well reacted product suitable for use in varnishes, lacquers and other coating compositions. Thus 40 parts tri-ethanolamine, 60 parts phthalic anhydride and 3 parts urea were heated slowly to 240° C. and held for 15 minutes without the formation of any infusible polymers.

From the foregoing it will be evident that my primary objective is to obtain soluble resinous or balsamic complexes which have been reacted in a deep-seated manner to enable such complexes to be used in coating compositions and in such use to exhibit a degree of resistance under the various conditions of exposure likely to occur, whereby satisfactory and durable coatings are secured. It is a comparatively simple matter to heat a mixture of the poly hydric alcohol and the organic acid to obtain a resin, but such resins are crude, contain much free acid, and perish very easily on exposure. In addition their high content of free acid renders them objectionable to the lacquer industry, since the requirements in the latter are for resins of low acidity. By the employment of a mono basic acid with a poly basic acid the reaction as a rule may be carried somewhat further, but in many cases not far enough to secure the desired degree of resinification and inter-resinification. The employment of a base to obtain a base-modified resinous complex of the polyhydric alcohol organic-acid type enables the reaction to be carried forward to a much greater degree and with far more profound resinification, while still preserving solubility in the various common and readily available organic solvents used in the varnish and lacquer industry. This does not mean that the base-modified complexes are soluble in all such solvents, but that they are sufficiently soluble in some of the available solvents to be of commercial significance in the coating field. When using amines to form a base-modified resinous complex of for example the glycerol phthalic-acid type, it is sometimes desirable to carry out the reaction in an autoclave at pressures well above atmospheric. In such cases the effect of pressure is helpful in aiding in the reaction and amines which may be quite volatile at atmospheric pressure are retained in the reacting mass to prevent the formation of infusible and insoluble products. I therefore include within the scope of the present invention a pressure-reacted base-modified soluble resinous complex of the type designated by the foregoing. The process of making resinous substances in accordance with the numerous illustrations set forth above also forms a part of this application.

What I claim is:—

1. A composition of matter comprising a mixed ester of an acidic gum, a polyhydric alcohol and adipic acid.

2. A composition of matter comprising a mixed ester of an acidic gum, glycerol, and adipic acid.

3. A composition of matter comprising a mixed ester of colophony, glycerol and adipic acid.

4. Process of preparing a resin which comprises heating to reaction temperature in the presence of condensing agents an acidic gum, a polyhydric alcohol, and a straight chain aliphatic dibasic acid.

5. A composition of matter comprising the reaction products of castor oil, glycerol and adipic acid.

6. A composition of matter comprising the reaction product of castor oil, a polyhydric alcohol having over two hydroxyl groups, and adipic acid.

7. A composition of matter comprising the reaction product of castor oil, a polyhydric alcohol having over two hydroxyl groups, an aliphatic dibasic acid and a drying oil.

8. A composition of matter comprising the reaction product of castor oil, a polyhydric alcohol having over two hydroxyl groups, an aliphatic dibasic acid and linseed oil.

9. A composition of matter comprising the reaction product of castor oil, glycerol, adipic acid, and linseed oil.

10. A composition of matter comprising the reaction product of castor oil, glycerol, adipic acid, and a drying oil.

11. Process of producing a rubber-like mass which comprises heating to reaction temperature castor oil, a polyhydric alcohol having over two hydroxyl groups, an aliphatic dibasic acid, and a drying oil.

12. A composition of matter comprising the condensation product of an aliphatic dibasic acid, an aliphatic monobasic acid derived from the hydrolysis of a natural fatty oil glyceride, a polyhydric alcohol, and unhydrolyzed fatty oil glycerides.

13. A process for preparing a resinous mass which comprises heating to reaction temperature an aliphatic dibasic acid, an aliphatic monobasic acid derived from the hydrolysis of a natural fatty oil glyceride, a polyhydric alcohol and unhydrolyzed fatty oil glycerides.

CARLETON ELLIS.